(12) United States Patent
Wu

(10) Patent No.: US 11,959,470 B2
(45) Date of Patent: Apr. 16, 2024

(54) AIR PUMP WITH RELIEF DEVICE CONFIGURED FOR DISPENSING TRACE AMOUNT OF AIR

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 456 days.

(21) Appl. No.: 17/246,849

(22) Filed: May 3, 2021

(65) Prior Publication Data
US 2022/0349396 A1  Nov. 3, 2022

(51) Int. Cl.
F04B 39/10 (2006.01)
F04B 49/22 (2006.01)
F16K 17/04 (2006.01)

(52) U.S. Cl.
CPC .......... *F04B 39/1033* (2013.01); *F04B 49/22* (2013.01); *F16K 17/0486* (2013.01)

(58) Field of Classification Search
CPC ...... F04B 49/22; F04B 49/03; F04B 39/1033; F04B 33/005; F04B 53/129; F04B 49/24; F04B 39/1013; F16K 17/0486; F16K 3/243; Y10T 137/88054; Y10T 137/36; B60S 5/043; B60S 5/04; B60C 29/068; B60C 29/06; B60C 29/04
USPC ...... 137/614.18, 613, 614.11, 614.12, 614.2, 137/231, 223
See application file for complete search history.

(56) References Cited

U.S. PATENT DOCUMENTS

| | | | | |
|---|---|---|---|---|
| 1,170,050 A | * | 2/1916 | Daniels | F16K 17/196 137/512.5 |
| 6,070,855 A | * | 6/2000 | Chuang | F04B 33/005 251/339 |
| 9,108,474 B2 | * | 8/2015 | Chu | B60C 29/068 |
| 2005/0263185 A1 | * | 12/2005 | Chen | F04B 33/005 137/231 |
| 2012/0227831 A1 | * | 9/2012 | Kozuschek | F16K 15/20 137/231 |
| 2020/0011310 A1 | * | 1/2020 | Yang | F04B 39/0022 |
| 2020/0347946 A1 | * | 11/2020 | Liebhart | F04B 53/1032 |
| 2021/0140571 A1 | * | 5/2021 | Chuang | F16L 29/02 |

FOREIGN PATENT DOCUMENTS

TW    M566758 U    9/2018

* cited by examiner

Primary Examiner — Craig J Price
Assistant Examiner — Andrew J Rost

(57) ABSTRACT

A relief device in air pump includes a main body defining an interior space and a discharge passage fluidly communicating with the interior space. The discharge passage is selectively closed and opened by a valve device. The valve device is movable in the discharge passage. The valve device includes a first sealing portion and a second sealing portion selectively engaging with the discharge passage. The valve device is movable between a first position in which one of the first and the second sealing portions engages with the discharge passage and a second position in which the other of the first and the second sealing portion engages with the discharge passage. The discharge passage has a length measuring from the first end to the second end thereof, which is smaller than a length which measures a separation distance between the first and the second sealing portions.

14 Claims, 5 Drawing Sheets

AIR PUMP WITH RELIEF DEVICE CONFIGURED FOR DISPENSING TRACE AMOUNT OF AIR

BACKGROUND OF THE INVENTION

1. Field of the Invention

The present invention relates to an air pump and, particularly, to a relief device configured for dispensing a trace amount of air from the air pump.

2. Description of the Related Art

TW Pat. No. M566758 shows an air pump including a holding seat, a pumping assembly, a joint head assembly, and a pressure gage. The holding seat has a hollow housing. The pumping and the joint head assemblies are respectively disposed at an inlet end and an outlet end of the housing. The holding seat defines a measuring portion and the pressure gage is disposed at the measuring portion. The housing of the holding seat is engaged with a connecting end of the joint head assembly through a connection which includes at least one positioning block engaging in at least one positioning slot. Further, the at least one positioning block extends through the housing and the connecting end.

Further, the air pump includes a pressure relief for decreasing the pressure of the air pump if the pressure exceeds a predetermined value. Specifically, as long as the pressure relief is activated, the pressure of the air pump continues to decrease and so the user needs to control the pressing time to adjust the amount of pressure decrease. Nevertheless, it is difficult to achieve a fine adjustment of the pressure.

The present invention is, therefore, intended to obviate or at least alleviate the problems encountered in the prior art.

SUMMARY OF THE INVENTION

According to the present invention, a relief device in air pump configured for dispensing a trace amount of air from the air pump includes a main body which defines an interior space and a discharge passage fluidly communicating with the interior space. The discharge passage extends from a first end adjacent to the interior space to a second end which fluidly communicates with the outside of the main body. The discharge passage is selectively closed and opened to the outside of the main body by a valve device. The valve device is movable in the discharge passage. The valve device includes a first sealing portion and a second sealing portion selectively engaging with the discharge passage to prevent air discharged to the outside of the main body through the discharge passage. The valve device is movable between a first position in which one of the first and the second sealing portions engages with the discharge passage and a second position in which the other of the first and the second sealing portion engages with the discharge passage. The discharge passage has a first length measuring from the first end to the second end thereof. The first length is smaller than a second length which measures a separation distance between the first and the second sealing portions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing other structures, methods and systems for carrying out the several purposes of the present invention. It is important, therefore, that the claims be regarded as including such equivalent constructions insofar as they do not depart from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
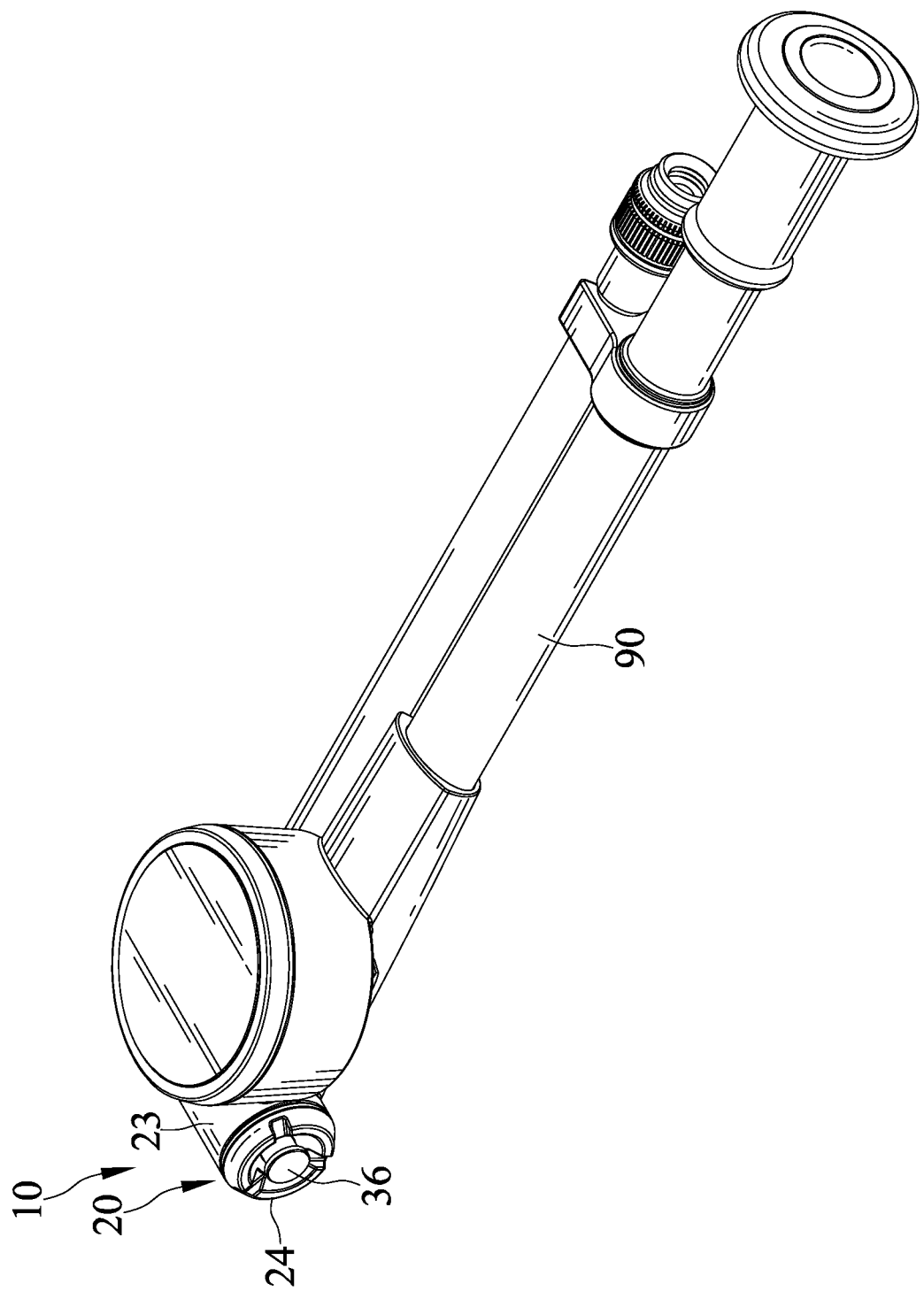
FIG. 1 is a perspective view of an air pump with a relief device configured for dispensing a trace amount of air from the air pump in accordance with the present invention.
Figure 2:
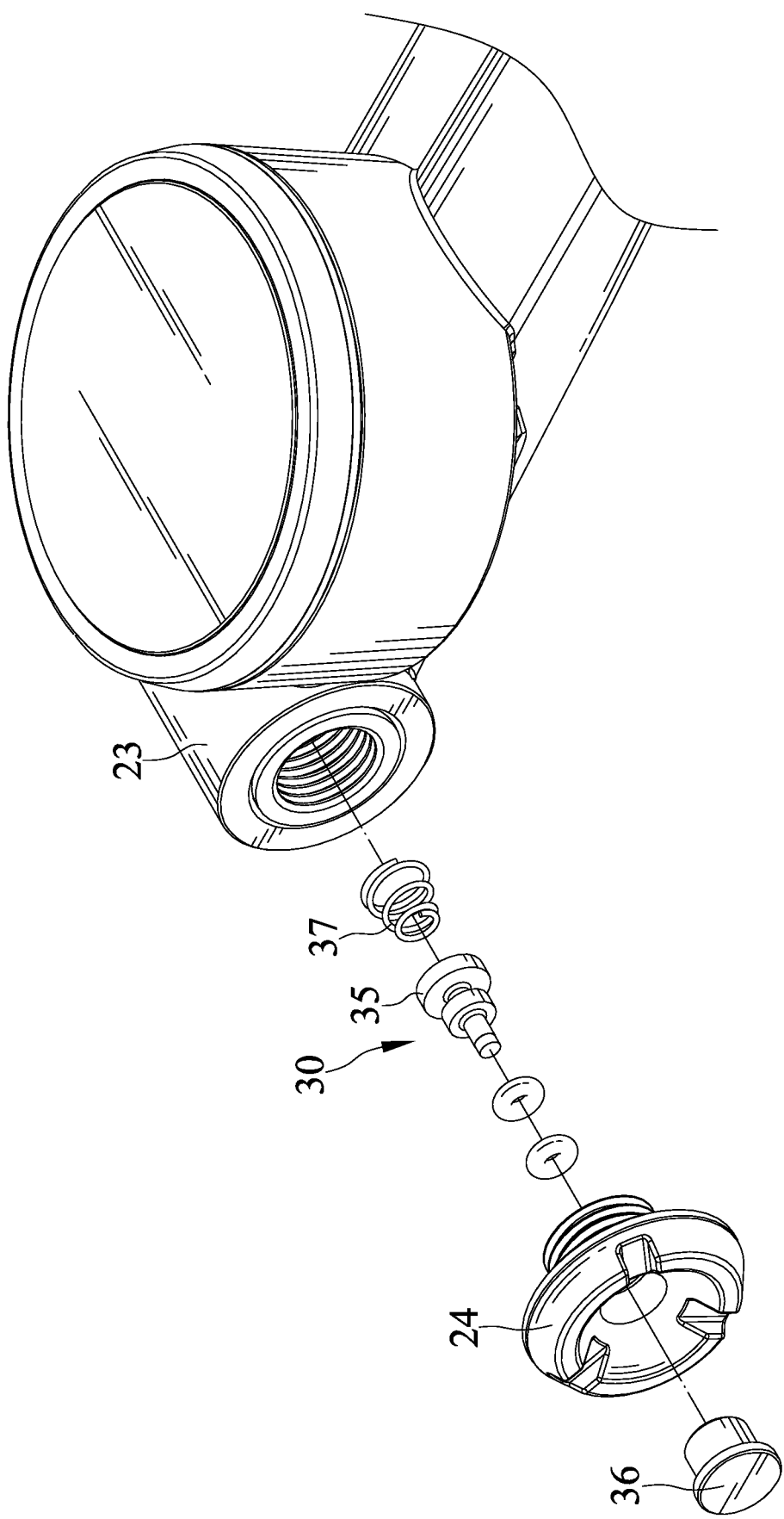
FIG. 2 is an exploded perspective view of the relief device of FIG. 1.
Figure 3:
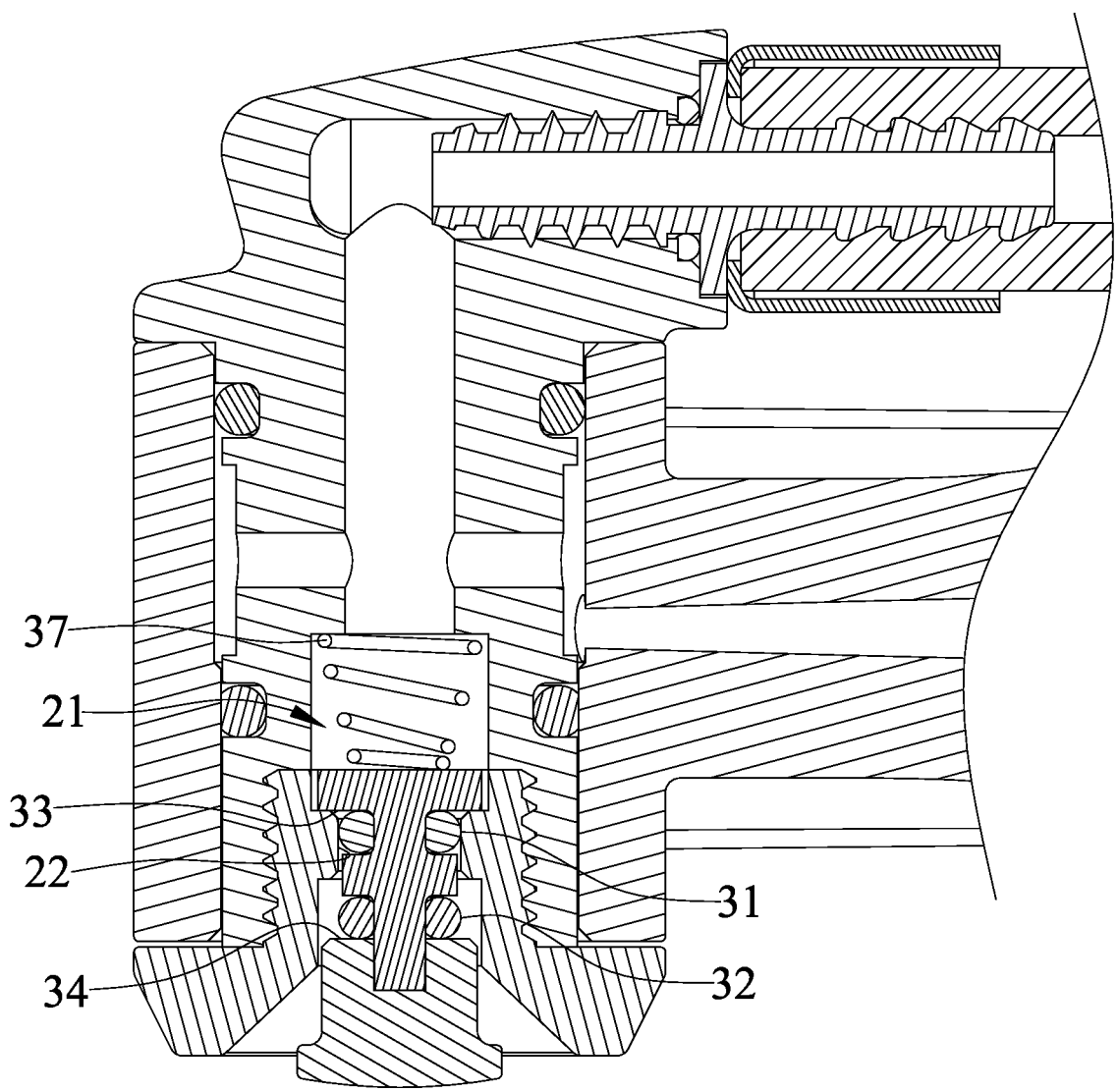
FIG. 3 is a cross-sectional view of FIG. 1, illustrating the relief device preventing air in the air pump from flowing therethrough.
Figure 4:
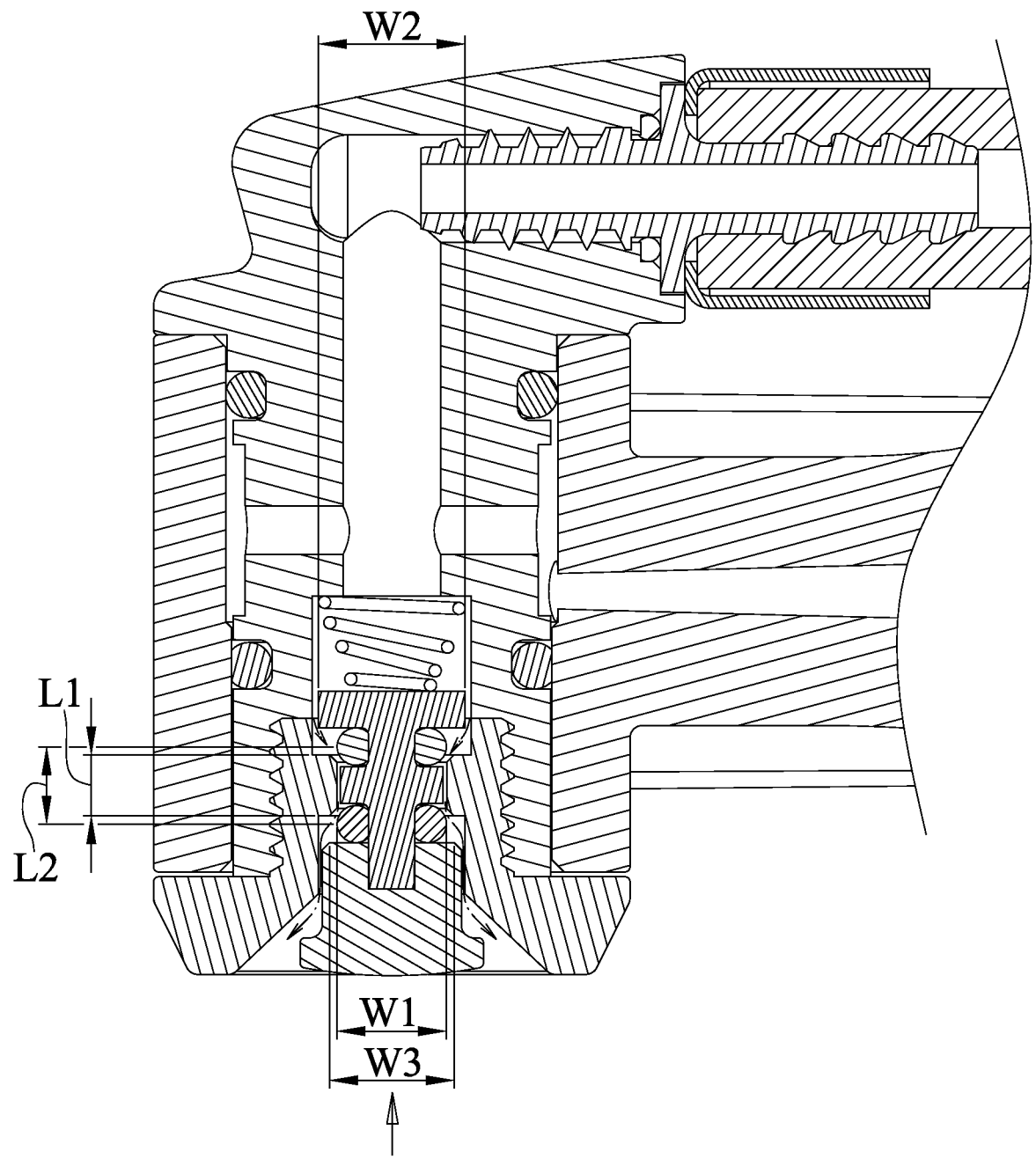
FIG. 4 is a cross-sectional view of FIG. 1, illustrating the relief device dispensing a trace amount of air from the air pump.
Figure 5:
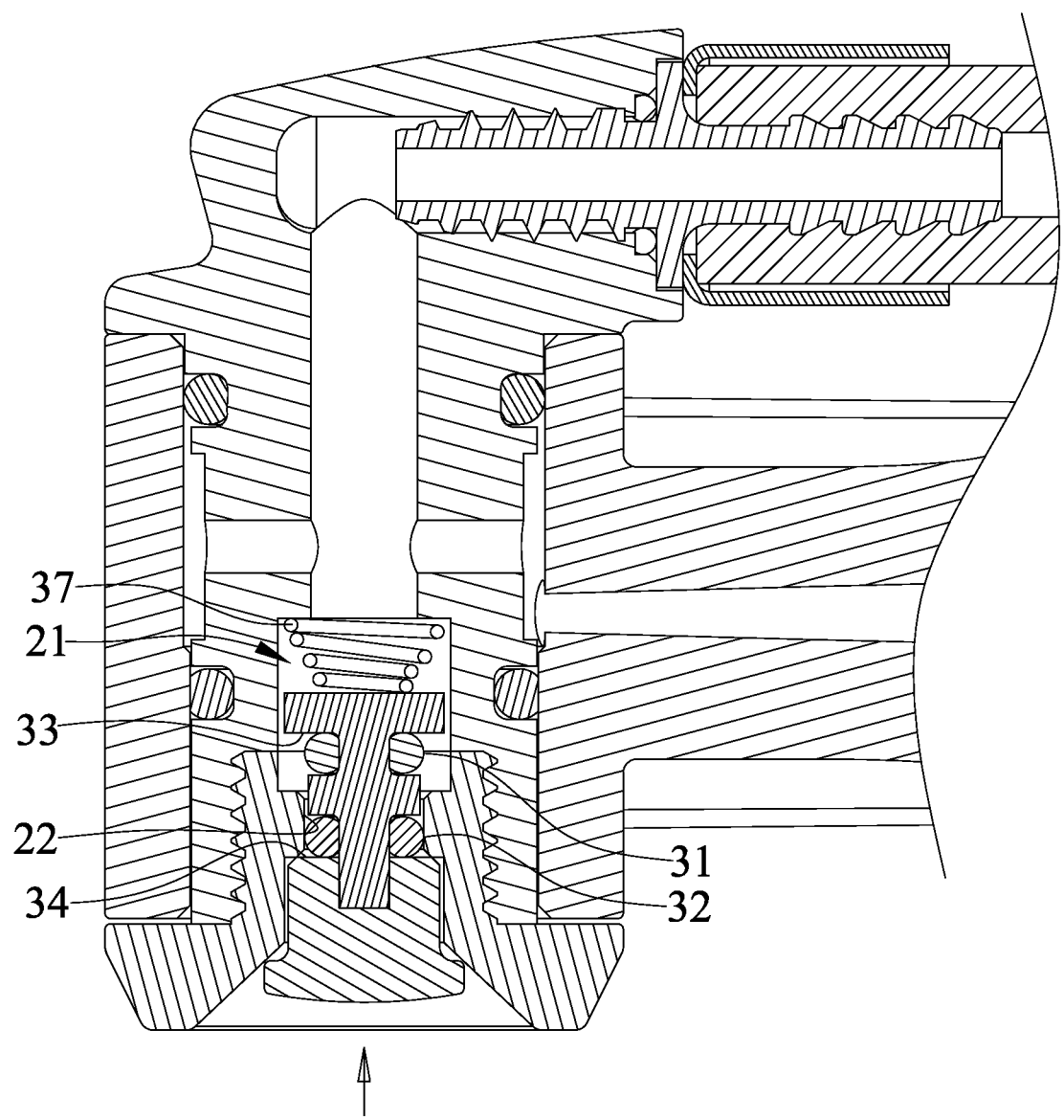
FIG. 5 is a cross-sectional view of FIG. 1, illustrating the relief device preventing air in the air pump from flowing therethrough.

FIGS. 1 through 5 show an air pump 90 with a relief device 10 configured for dispensing a trace amount of air from the air pump in accordance with the present invention.

The relief device 10 includes a main body 20 which defines an interior space 21 and a discharge passage 22 fluidly communicating with each other. The main body 20 forms a housing 23 defining the interior space 21. Air will flow into the interior space 21 upon the operation of the air pump 90. The discharge passage 22 extends from a first end adjacent to the interior space 21 to a second end which fluidly communicates with the outside of the main body 20. The discharge passage 22 has a length L1 measuring from the first end to the second end thereof. The discharge passage 22 has a width W1 perpendicular to the length L1. The discharge passage 22 is selectively closed and opened to the outside of the main body 20 by a valve device 30. The main body 20 includes a cap 24 coupled thereto for retaining the valve device 30 in the main body 20. The cap 24 is coupled to the housing 23. The cap 24 defines the discharge passage 22. The cap 24 is hollow which includes a middle portion defining the discharge passage 22 and end portions with great width than the width W1.

The valve device 30 is movable in the discharge passage 22. The valve device 30 includes a sealing portion 31 and a sealing portion 32 selectively engaging with the discharge passage 22 to prevent air discharged to the outside of the main body 20 through the discharge passage 22. The valve device 30 is movable between a first position in which one of the sealing portions 31 and 32 engages with the discharge passage 22 and a second position in which the other of the sealing portion 31 and 32 engages with the discharge passage 22. When the valve device 30 is moved to the first position, the sealing portion 31 abuts against the periphery of the discharge passage 22. When the valve device 30 is moved to the second position, the sealing portion 32 abuts against the periphery of the discharge passage 22. Besides, when the valve device 30 moves in a transition between the first and the second positions, none of the sealing portions 31 and 32 engage with the discharge passage 22. Further, a length L2 which measures a separation distance between the sealing portions 31 and 32. The length L1 is smaller than the length L2.

The valve device 30 includes a retaining side 33 adjacent to the sealing portion 31 and a retaining side 34 adjacent to the sealing portions 32. When the valve device 30 is moved to the first position, the first retaining side 33 abuts against the first end of the discharge passage 22. When the valve device 30 is moved to the second position, the second retaining side 34 abuts against the first end of the discharge passage 22. The retaining side 33 has a width W2 perpendicular to the length L2 and the retaining side 34 has a width W3 perpendicular to the length L2, respectively. Further, the width W1 is less than the widths W2 and W3.

The valve device 30 includes the sealing portions 31 and 32 on a moving member 35. The moving member 35 includes a first seal and a second seal disposed circumferentially thereon forming the sealing portions 31 and 32, respectively.

The valve device 30 includes a control 36 configured to be actuated to push the moving member 35. The moving member 35 is urged by a resilient member 37. The moving member 35 has a first end extending into the interior space 21 and a second end connecting with the control 36. The control 36 has an end being exposed for receiving an input from a user. The resilient member 37 has an end abutting against the first end of the moving member 35. When the valve device 30 is moved from the first position to the second position, the resilient member 37 is gradually compressed. On the other end, when the valve device 30 is moved from the second position to the first position, the resilient member 37 is relieved.

In view of the foregoing, the discharge passage 22 is selectively closed and opened to the outside of the main body 20 by the valve device 30. When the valve device 30 is moved to the first or the second positions, the discharge passage 22 is closed. When the valve device 30 moves in a transition between the first and the second positions, the discharge passage 22 is opened to dispense a trace amount of air from the air pump 90.

The foregoing is merely illustrative of the principles of this invention and various modifications can be made by those skilled in the art without departing from the scope and spirit of the invention.

What is claimed is:

1. A relief device in an air pump configured for dispensing a trace amount of air from the air pump, comprising:
a main body defining an interior space and a discharge passage fluidly communicating with each other, wherein the discharge passage extends from a first end adjacent to the interior space to a second end which fluidly communicates with the outside of the main body, wherein the discharge passage is selectively closed and opened to the outside of the main body by a valve device, wherein the valve device is movable in the discharge passage, wherein the valve device includes a first sealing portion and a second sealing portion selectively engaging with the discharge passage to prevent air discharged to the outside of the main body through the discharge passage, wherein the valve device is movable between a first position in which one of the first and the second sealing portions engages with the discharge passage and a second position in which the other of the first and the second sealing portion engages with the discharge passage, wherein the discharge passage has a first length measuring from the first end to the second end thereof, wherein the first length is smaller than a second length which measures a separation distance between the first and the second sealing portions, wherein the valve device includes a first retaining side adjacent to the first sealing portion and a second retaining side adjacent to the second sealing portions, wherein when the valve device is moved to the first position, the first retaining side abuts against the first end of the discharge passage, and wherein when the valve device is moved to the second position, the second retaining side abuts against the first end of the discharge passage.

2. The relief device as claimed in claim 1, wherein the valve device is movable between the first position in which the first sealing portion abuts against the periphery of the discharge passage and the second position in which the second sealing portion abuts against the periphery of the discharge passage.

3. The relief device as claimed in claim 2, wherein when the valve device moves in a transition between the first and the second positions, none of the first and the second sealing portions abut against the periphery of the discharge passage to allow a trace amount of air to be dispensed.

4. The relief device as claimed in claim 3, wherein the valve device includes the first and the second sealing portions on a moving member.

5. The relief device as claimed in claim 1, wherein when the valve device moves in a transition between the first and the second positions, none of the first and the second sealing portions engage with the discharge passage.

6. The relief device as claimed in claim 1, wherein the discharge passage has a first width perpendicular to the first length, the first retaining side has a second width perpendicular to the second length and the second retaining side has a third width perpendicular to the second length, respectively, and wherein the first width is less than the second and the third widths.

7. The relief device as claimed in claim 1, wherein the valve device includes the first and the second sealing positions on a moving member.

8. The relief device as claimed in claim 7, wherein the moving member includes a first seal and a second seal disposed circumferentially thereon forming the first and the second sealing portions, respectively.

9. The relief device as claimed in claim 7, wherein the valve device includes a control configured to be actuated to push the moving member.

10. The relief device as claimed in claim 9, wherein the moving member has a first end extending into the interior space and a second end connecting with the control.

11. The relief device as claimed in claim 10, wherein the control has an end being exposed for receiving an input from a user.

12. The relief device as claimed in claim 10, wherein the moving member is urged by a resilient member, and wherein the resilient member has an end abutting against the first end of the moving member.

13. A relief device in an air pump configured for dispensing a trace amount of air from the air pump, comprising:
   a main body defining an interior space and a discharge passage fluidly communicating with each other, wherein the discharge passage extends from a first end adjacent to the interior space to a second end which fluidly communicates with the outside of the main body, wherein the discharge passage is selectively closed and opened to the outside of the main body by a valve device, wherein the valve device is movable in the discharge passage, wherein the valve device includes a first sealing portion and a second sealing portion selectively engaging with the discharge passage to prevent air discharged to the outside of the main body through the discharge passage, wherein the valve device is movable between a first position in which one of the first and the second sealing portions engages with the discharge passage and a second position in which the other of the first and the second sealing portion engages with the discharge passage, wherein the discharge passage has a first length measuring from the first end to the second end thereof, wherein the first length is smaller than a second length which measures a separation distance between the first and the second sealing portions, wherein the main body includes a cap coupled thereto for retaining the valve device in the main body, wherein the cap defines the discharge passage, wherein the discharge passage has a first width perpendicular to the first length, and wherein the cap is hollow which includes a middle portion defining the discharge passage and end portions with a greater width than the first width.

14. The relief device as claimed in claim 13, wherein the main body forms a housing defining the interior space and the cap is coupled to the housing.

* * * * *